UNITED STATES PATENT OFFICE.

HARALD THAÜLOW, OF CHRISTIANIA, NORWAY.

IMPROVEMENT IN PROCESSES OF TREATING WOOL OIL OR GREASE TO OBTAIN GLUE OR GELATINE.

Specification forming part of Letters Patent No. 189,149, dated April 3, 1877; application filed February 1, 1877.

*To all whom it may concern:*

Be it known that I, Dr. HARALD THAÜ-LOW, residing at Christiania, in the Kingdom of Norway, have invented certain improvement in manufacturing glue of black fetid animal tar, obtained from wool and hair, &c., of which the following is a specification:

The object of the present invention is to utilize the ordinary oil or grease which is extracted from fleece-wool and animal-hair, and which has generally been deemed useless except as a fertilizing material.

The invention consists in preparing animal-glue and gelatine from wool oil or grease by combining said oil with water and beef or animal-blood, then boiling the mixture and straining or filtering the same, and subsequently again boiling the filtered liquid with beef-blood, and again straining the same, after which the liquid may be evaporated to obtain the consistency of glue or gelatine.

For some time the observation has been made that hair, wool, and generally the cellular tissue of the animal epithelium, upon which boiling water or steam, under the ordinary atmospheric pressure, exert little or no influence, exude a tar-like fluid when acted on by an extra degree of moist heat or superheated steam. This fluid has so far proven useless, being in consistency and color perfectly similar to the ordinary wood-tar, possessing a really noxious smell, sticking fast to everything with which the tar comes in contact, and all experiments to remedy these peculiarities have so far failed.

By my invention I have succeeded in changing the repulsive black hair-tar into sweet, pure, and clear varieties of glue.

Subjecting the tar to a chemical analysis, I obtained, among other interesting scientific results, the discovery that this tar is not a simple homogeneous substance, but a compound, consisting of an ingredient which is soluble in water; next, of a powder-form substance not soluble in water, and, lastly, of empyreumatic ammoniates.

I further found that the empyreumatic ammoniacal salts do not, according to their nature, undergo a watery solution, but that, on the contrary, they attach to the solid body, because this consists, principally, of carbonaceous powder.

Led on by this discovery the inventor has succeeded in transforming, by a new process, the fetid hair-tar, which hitherto has scarcely found any other use than for manure, into pure glue.

This transformation is effected in the following manner: Mix the hair-tar with two parts of water, and one-fortieth part of fresh beef-blood, heat to the boiling-point, and then strain through a woolen cloth. When the filtrate is reduced to a temperature of about 40°, mix once more with one-eightieth of beef-blood, and raise again to the boiling-point. The fluid upon being then again strained through a filter is completely freed of all disagreeable smell, and it may then be evaporated in an ordinary pan to the consistency of the ordinary glue or gelatine of commerce, to which it is similar in appearance and quality.

Having thus described my invention, what I claim as new, and as my invention, is—

The process herein described of treating wool oil or grease to obtain glue or gelatine therefrom, consisting in the following steps, successively performed, viz: combining the crude oil with water and beef-blood, boiling the mixture, straining or filtering the same, mixing beef-blood with the strained and cooled liquid, and then reboiling the same, substantially as herein set forth.

In testimony whereof I have signed my name to this specification in the presence of two subscribing witnesses.

DR. HARALD THAÜLOW.

Witnesses:
GERARD WENSESLAUS V. NAWROCKI,
LOUIS AUERBACH.